United States Patent [19]

Kagawa

[11] Patent Number: 4,495,569
[45] Date of Patent: Jan. 22, 1985

[54] INTERRUPT CONTROL FOR MULTIPROCESSOR SYSTEM WITH STORAGE DATA CONTROLLING PROCESSOR INTERRUPTED BY DEVICES

[75] Inventor: Eiichi Kagawa, Kobe, Japan

[73] Assignee: Mitsubishi Denki Kabushiki Kaisha, Tokyo, Japan

[21] Appl. No.: 392,302

[22] Filed: Jun. 25, 1982

[51] Int. Cl.³ .............................................. G06F 15/16
[52] U.S. Cl. .................................................... 364/200
[58] Field of Search ... 364/200 MS File, 900 MS File

[56] References Cited

U.S. PATENT DOCUMENTS

4,396,978 8/1983 Hammer et al. ................... 364/200

Primary Examiner—Raulfe B. Zache
Attorney, Agent, or Firm—Lowe, King, Price & Becker

[57] ABSTRACT

A multiprocessor system includes a random access memory (85) for storing a processor number data specifying that an interrupt from any of a plurality of devices (6l to 6m) to any one of a plurality of processors (1l to 1n) is permitted. If and when an interrupt request signal is applied from the device (61) to an interrupt controller (8), a processor number data indicating a processor which the device (61) can interrupt is read out from the random access memory (85). The interrupt controller (8) applies an interrupt signal to a processor (11), for example, according to the processor number data. Correspondingly, the processor (11) applies a bus request signal to a bus controller (7). According to the bus request signal, the bus controller (7) controls a bus selecting circuit (3) to connect a local bus (21) of the processor (11) to a common bus (5).

7 Claims, 8 Drawing Figures

| | ADDRESS | ADDRESS DATA | ACK | SELECT SIGNAL | INTERRUPT INSTRUCTIONS | 83 |
|---|---|---|---|---|---|---|
| 830 | 0 | 0 | | | | |
| 831 | 1 | 1 | | | | |
| 832 | 2 | 2 | | | | |
| ⋮ | ⋮ | ⋮ | | | | |
| 83n | n | n | | | | |

FIG. 6

| NUMBER OF DEVICE | ADDRESS | NUMBER OF PROCESSOR | | | | 85 |
| | | 0 | 1 | 2 | ⋯ | n |
|---|---|---|---|---|---|---|
| IT 0 | A | 1 | 0 | 0 | | 0 |
| IT 1 | A+1 | 0 | 1 | 0 | | 0 |
| IT 2 | A+2 | 0 | 1 | 0 | | 1 |
| ⋮ | ⋮ | ⋮ | ⋮ | ⋮ | | ⋮ |
| IT (m−1) | A+(m−1) | 1 | 0 | 1 | ⋯ | 0 |

FIG. 8

INTERRUPT CONTROL FOR MULTIPROCESSOR SYSTEM WITH STORAGE DATA CONTROLLING PROCESSOR INTERRUPTED BY DEVICES

BACKGROUND OF THE INVENTION

1. Field of the Invention

The present invention relates to a multiprocessor system. More particularly, the present invention relates to an improvement of a multiprocessor system wherein a device or devices are commonly controlled by a plurality of processors.

2. Description of the Prior Art

A multiprocessor system is generally utilized in case where a plurality of processors commonly use a device or devices. Such devices comprise peripheral apparatuses for a computer such as a memory, a process input-output apparatus, a typewriter, a floppy disk and a cathode-ray tube display. In order to commonly control such devices, a multiprocessor system of a bus structure using a common bus is utilized as a cheap approach which is able to be fast processed.

Figure 1:
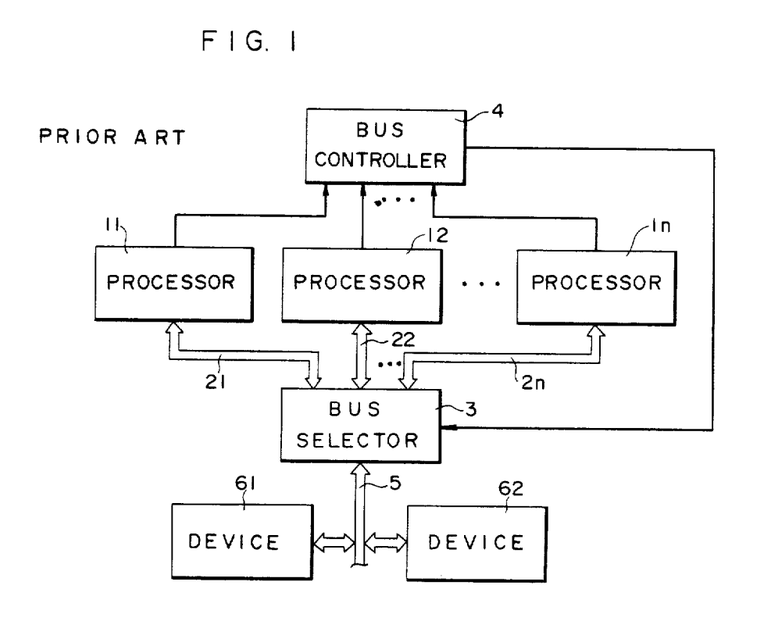
FIG. 1 is a schematic block diagram of a prior art multiprocessor system.

FIG. 1 is a schematic block diagram of a prior art multiprocessor system. In FIG. 1, a plurality of processors 1*l* to 1*n* commonly control two devices 61 and 62, for example. To this end, local buses 2*l* to 2*n* of the respective processors 1*l* to 1*n* are connected to a bus selecting circuit 3. The bus selecting circuit 3 selects any of the local buses 2*l* to 2*n* and connects the same to a common bus 5. The devices 61 and 62 are commonly connected to the common bus 5. The bus selecting circuit 3 is controlled by a control signal from a bus controller 4. More particularly, if and when the bus controller 4 receives any one of the bus request signals REQ1 to REQn from the respective processors 1*l* to 1*n*, the bus controller 4 identifies the bus request signal to recognize which local bus of the local buses 2*l* to 2*n* should be connected to the common bus 5 so that a control signal is applied to the bus selecting circuit 3.

Accordingly, if and when the processor 1*l*, for example, outputs a bus request signal REQ1, then the bus controller 4 controls the bus selecting circuit 3 so that the local bus 21 is connected to the common bus 5. As a result, the processor 1*l* can communicate with the devices 61 and 62.

On the other hand, in a stand-alone system having generally a single processor, an emergency processing request to the processor is sometimes generated from a device side. Such an emergency processing request comprises a generation of timing from an external signal for a processor input, and a generation of status changing signal for a device, such as a completion of job, fullness of the data or empty of the data. The stand-alone system is adapted such that an interrupt number is provided for each factor of requests from the device and a corresponding interrupt number is recognized when an interrupt signal is applied to the processor and the corresponding interrupt processing is performed. Since such interrupt is performed for each device, the number of necessary interrupt numbers are the number of devices which request an interrupt.

Even in a multiprocessor system as shown in FIG. 1, an interrupt request from the device side to the processor is generated in the same manner as the stand-alone system and thus an interrupt control is required. However, since a multiprocessor system includes a plurality of processors and a plurality of devices, there are many combinations thereof. For this reason, an interrupt control in the multiprocessor system is very much more complicated as compared with the above described stand-alone system and thus, unless such a complicated process is achieved, an interrupt from the device to the corresponding processor can not be processed. More particularly, assuming that the number of devices which request an interrupt is m, it is necessary to decide which processor of the n processors the m interrupt requests are made to.

For the reason described in the foregoing, a prior art multiprocessor system adopted the following approach. More particularly, in order to achieve an interrupt request from the device, an interrupt status signal is outputted to the common bus 5 and all of the processors 1*l* to 1*n* usually scan the interrupt status signals in a cyclic manner by means of a program, so that a generation of interrupt request is recognized. An alternative approach is that a device or devices requesting an interrupt are not provided as a device that the respective processors 1*l* to 1*n* can commonly control, but are connected to a local bus of a processor to be interrupted and thus are used as a dedicated device for the processor so that the same interrupt control as that in the stand-alone system is made.

As described in the foregoing, in accordance with a prior art multiprocessor system, in case where an interrupt request from a device to any of the processors is performed, an interrupt response is lowered since a scan is made in accordance with each program of each processor so as to recognize an interrupt. In addition, if a device is occupied by a specific processor, all other processors can not control the device. Furthermore, if a device is occupied by any of processors, the number of devices to be occupied should be the number of processors which require the device and thus the system is very expensive, which is a significant disadvantage.

SUMMARY OF THE INVENTION

Briefly stated, the present invention is adapted such that data concerning processors to be interrupted by respective devices is stored in data storing means and an interrupt control to a corresponding processor is performed based on the stored data when an interrupt request is generated from any of the devices. More particularly, the data storing means stores a destination data for specifying a processor to be interrupted by any of a plurality of devices. In response to an interrupt request from any of the devices, an interrupt destination data is read out from the data storing means to recognize the processor corresponding to the destination, so that an interrupt control to the corresponding processor is performed based on the result of recognition. Based on a bus request signal from the processor which received an interrupt control, bus selecting means switches the local bus of the processor to a common bus connected to a plurality pf devices, so that a bus line between the processor and the device is established.

In accordance with the present invention, a processor to be interrupted can be readily specified based on a destination data stored in the data storing means. Accordingly, an interrupt processing can be performed from any of a plurality of devices to an arbitrary processor and even if communication therebetween is made, such communication can be achieved with a relatively simple structure. More particularly, a complicated process of a prior art is not needed wherein in order that each processor judges whether there is an interrupt request to itself, each processor constantly scans an interrupt status signal outputted from a device or devices through the common bus to recognize generation of interrupt. In addition, the change of destination data can easily change the processor corresponding to the destination which a device wants to interrupt. Additionally, in accordance with the invention, performance of an interrupt control from a single device to a plurality of processors two, for example, is achieved extremely easily, based on the destination data.

In accordance with a preferred embodiment of the present invention, in the first step, if and when an interrupt permitting signal indicating that each device is permitted to interrupt each processor is commonly, applied to each device, any of the devices applies an inherent device number signal as an address signal to the storing means. Correspondingly, the storing means reads out the destination data of the processor that the device wants to interrupt. In the second step, an interrupt instruction signal is generated based on the destination data and an interrupt signal is applied to a corresponding processor based on the interrupt instruction signal and the destination data. The processor to which an interrupt signal is applied generates a bus request signal according to which the bus selecting signal generating means generates a bus selecting signal. A local bus of the corresponding processor is commonly connected to the common bus in response to the bus selecting signal.

Hence, if the operations in the second step are repeated by the number of processors, an interrupt control to the respective processors can be made based on interrupt requests from all of the devices.

Accordingly, a principal object of the present invention is to provide a cheap and efficient multiprocessor system which makes possible an interrupt control from any of a plurality of devices to any of a plurality of processors.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 2:
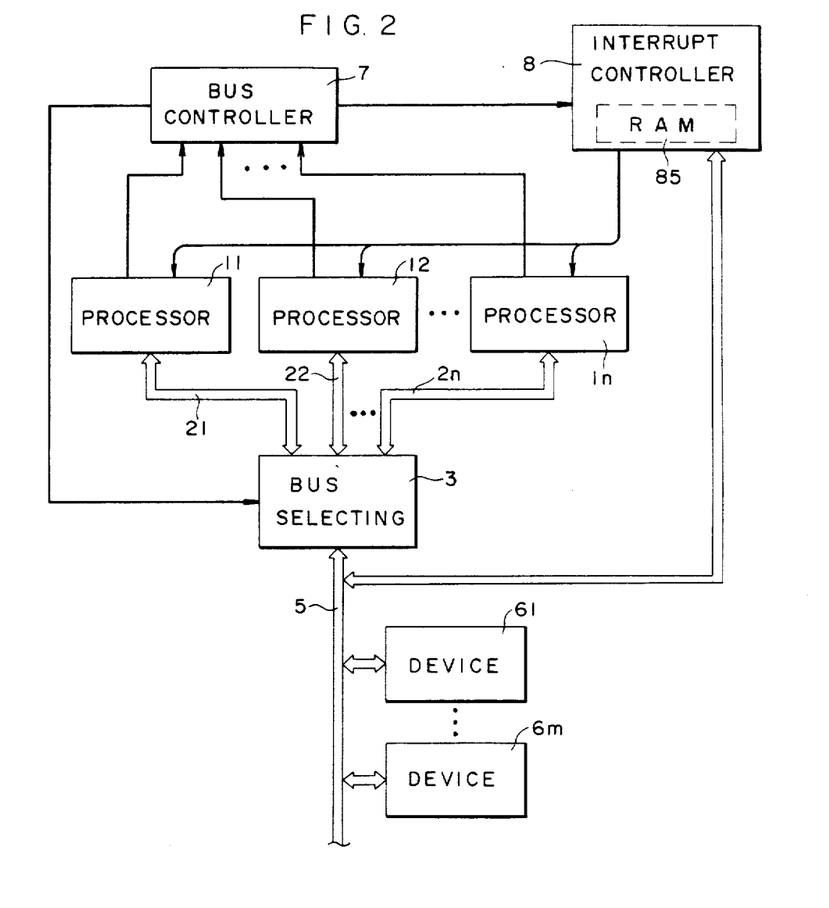
FIG. 2 is a schematic block diagram of one embodiment of the present invention.

FIG. 2 is a schematic block diagram of one embodiment of the present invention. Referring to FIG. 2, a schematic structure of one embodiment of the present invention will be described. A plurality of processors 1*l* to 1*n* as shown in FIG. 2 and a bus selecting circuit 3 are the same as those shown in FIG. 1. A plurality of devices 6*l* to 6*m* are connected to a common bus 5. Further, an interrupt controller 8 is provided for applying an interrupt signal to any of the processors 1*l* to 1*n* according to the request from the devices 6*l* to 6*m*. The interrupt controller 8 includes a random access memory 85 for storing the data indicating which processor an interrupt signal is applied to when an interrupt request is received from any of the devices 6*l* to 6*m*. The common bus 5 is connected to the interrupt controller 8. The interrupt controller 8 applies an interrupt permitting signal to each of the devices 6*l* to 6*m* through a common bus 5. If and when any of the devices 6*l* to 6*m* interrupts any of the processors, the device number data indicating a corresponding devices is applied, as an interrupt signal, to the interrupt controller 8 through the common bus 5. The interrupt controller 8 recognizes a processor to be interrupted based on the data stored in the random access memory 85 and provides an interrupt signal ITR to the processor. If a request signal, for example, low level signal, is applied to the bus controller 7 from any of the processors 1*l* to 1*n*, the bus controller 7 applies a bus busy signal to the interrupt controller 8 so that an interrupt from the devices 6*l* to 6*m* is inhibited.

Figure 3:
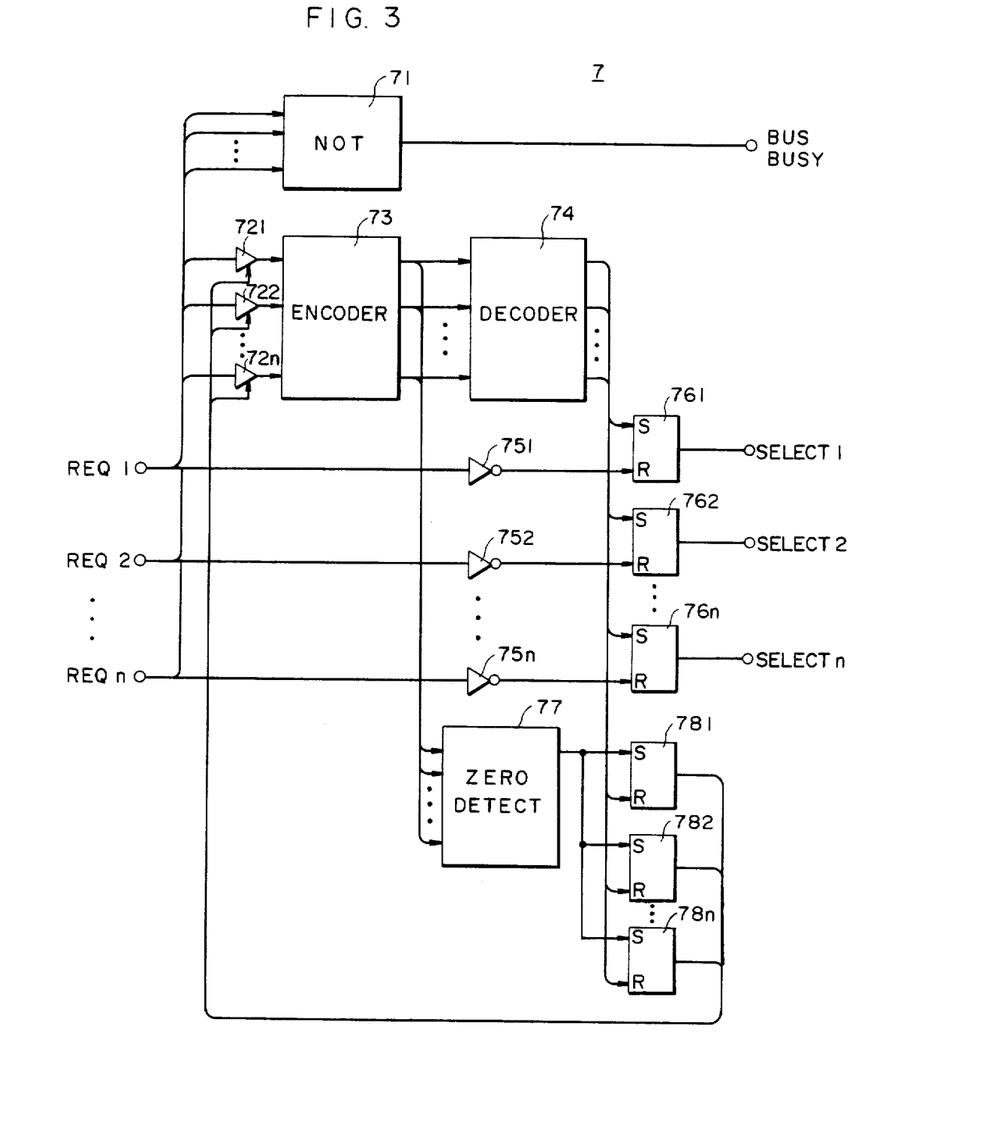
FIG. 3 is a detailed block diagram of a bus controller as shown in FIG. 2.

FIG. 3 is a detailed block diagram of the bus controller 7 as shown in FIG. 2. Referring to FIG. 3, a specific structure of the bus controller 7 will be explained. The bus request signals REQl to REQn of a low level outputted from the processors 1*l* to 1*n* are applied to a NOT circuit 71. The NOT circuit 71 is adapted such that a bus busy signal of a low level is outputted while any of the bus request signals is inputted and is structured by a combination of gate circuits, for example. Further, the bus request signals REQl to REQn are also applied to an encoder 73 through gate circuits 72*l* to 72*n*. The encoder 73 includes a priority encoder which encodes the number of the processor of the highest priority and provides the encoded output to the output terminals thereof, in response to the bus request signals REQl to REQn.

More particularly, it is assumed that four processors are provided and the priority is predetermined such that the processor 11 has the highest priority, the processor 12 has the second highest priority, the processor 13 has the third highest priority and the processor 14 has the lowest priority. In case where the higher three processors 11 to 13 simultaneously output the bus request signals REQl to REQ3, respectively, a code such as "1" is outputted in a manner of a pure binary number from the encoder 73 to be applied to a decoder 74. A code signal such as "0001" is withdrawn from the output terminals of the decoder 74. The respective output signals from the decoder 74 are applied to set input terminals of flip-flops 76*l* to 76*n* provided corresponding to the respective processors 1*l* to 1*n*. To reset input terminals of the flip-flops 76*l* to 76*n* are supplied signals from inverters 75*l* to 75*n* which invert the bus request signals REQl to REQn. Accordingly, the respective flip-flops 76*l* to 76*n* are set by the output signals from the decoder 74, respectively and are reset when the bus request signals REQl to REQn are removed, or when the level of the bus request signals become high level. The respective output signals from the flip-flops 76*l* to 76*n* are applied to the bus selecting circuit 3 as a selecting signal for selecting local buses 2*l* to 2*n*.

A zero detecting circuit 77 detects that the contents of the outputs from the encoder 73 are all "0", in other words, the circuit 77 detects that none of the bus request signals from any of the processors 1*l* to 1*n* are applied to the bus controller 7. A zero detecting signal outputted from the zero detecting circuit 77 is applied to set input terminals of flip-flops 78*l* to 78*n*. The output signal from the decoder 74 is applied to reset input terminals of the flip-flops 78*l* to 78*n*. The output signals from the flip-flops 78*l* to 78*n* are applied to the above described gate circuits 72*l* to 72*n*. The reason why the zero detecting circuit 77 and the flip-flops 78*l* to 78*n* are provided is that a situation where the bus request from a processor of a lower priority may not be accepted is removed since the priority level of the processors 1*l* to 1*n* is predetermined. More particularly, it is assumed that the processors 11, 12 and 13 simultaneously output bus request signals and thereafter the processor 14 outputs a bus request signal and then the processor 11 once again outputs a bus request signal after termination of occupation of the common bus 5. In such a case, at the time when the processors 12 and 13 terminate the occupation of the common bus 5, the processors 11 and 14 first output bus request signals and thus, in the light of the priority relation, the processor 11 first occupies the common bus 5 although the processor 14 actually first outputted a bus request signal.

Then, when no request signal is outputted, the zero detecting circuit 77 detects zero signals which set the flip-flops 78*l* to 78*n*. If and when the flip-flops 78*l* to 78*n* are set, the respective gate circuits 72*l* to 72*n* are opened so that the bus request signals REQ1 to REQn are applied to the encoder 73. If a bus request signal from the processor 11, for example, is applied, then the flip-flop 78*l* is reset by the output from the decoder 74 and the corresponding gate circuit 72*l* is closed. Hence, the bus request signals REQ1 from the processor 11 of the highest priority is not accepted unless other bus request signals REQ2 to REQn are outputted.

Figure 4:
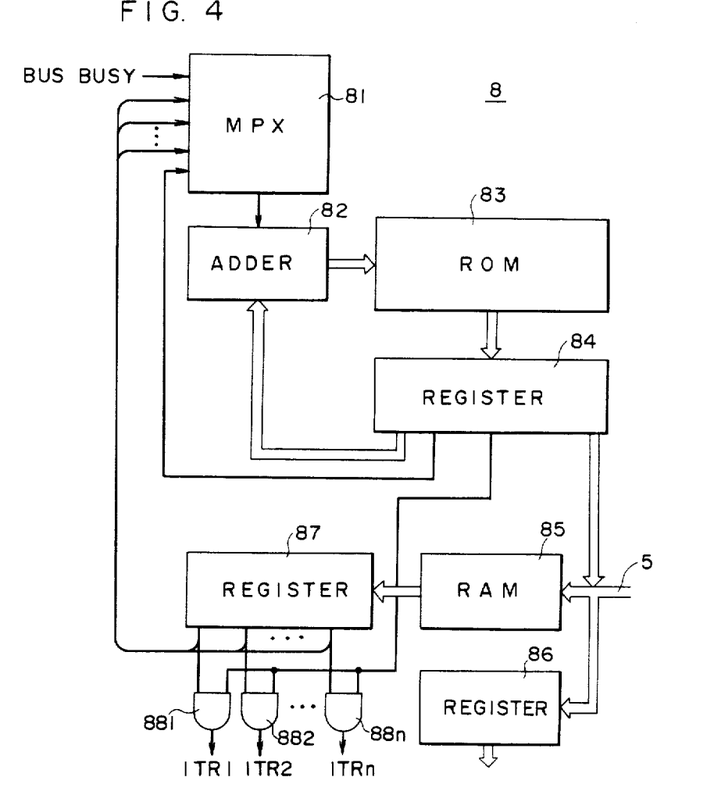
FIG. 4 is a detailed block diagram of an interrupt control circuit as shown in FIG. 2.
Figure 5:
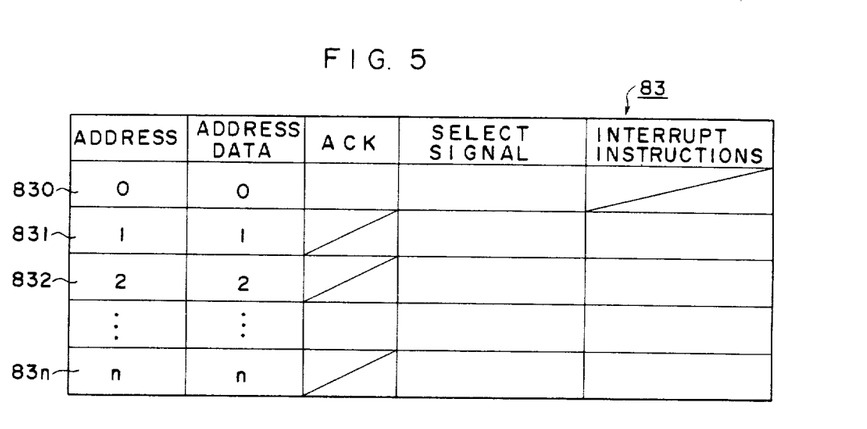
FIG. 5 is a diagram showing data stored in a read only memory as shown in FIG. 4.
Figure 6:
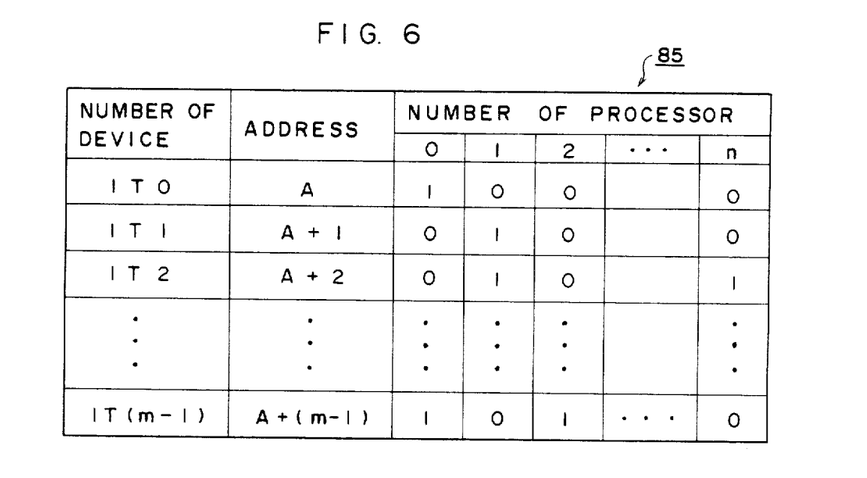
FIG. 6 is a diagram showing data stored in a random access memory as shown in FIG. 4.

FIG. 4 is a detailed block diagram of the interrupt controller 8 as shown in FIG. 2, FIG. 5 is a diagram showing the data stored in the read only memory 83 as shown in FIG. 4 and FIG. 6 is a diagram showing the data stored in the random access memory 85 as shown in FIG. 4. The interrupt controller 8 as shown in FIG. 4 performs an interrupt processing based on a microprogram comprising a first step, 1 and n repetitions of a second step, 2. In the step 1, an interrupt permitting signal ACK is outputted to the respective devices 6*l* to 6*m* through the common bus 5 and it is sensed whether a device number data is returned back as an interrupt request from each of the devices 6*l* to 6*m*. In the step 2, the contents stored in the random access memory 85 are read out based on the device number data from each of the devices 6*l* to 6*m* so that the processor to be interrupted is judged and thus the corresponding processor receives an interrupt processing. The operation in the step 2 is repeated for each processor. The microprogram is stored in the read only memory 83.

More particularly, the read only memory 83 contains storage areas 830 to 83*n* as shown in FIG. 5. A program in the step 1 is stored in the storage area 830 and the program in the step 2 is stored in the storage areas 83*l* to 83*n*. The program of the step 1 includes an address data "0", and a select signal. The program of the step 2 includes address data 1 to n, a select signal and an interrupt instruction signal. The program of each step in the read only memory 83 is sequentially read out and stored in the register 84. The interrupt permitting signal of the program stored in the register 84 is commonly applied to the respective devices 6*l* to 6*m* through the common bus 5. The address data is applied to an adder circuit 82 and the select signal is applied to a multiplexer 81 and the interrupt instruction signal is applied to one input terminal of AND gates 88*l* to 88*n*, respectively. If and when an interrupt permitting signal from the register 74 is applied to the respective devices 6*l* to 6*m*, a device number data is applied as an interrupt request signal to the random access memory 85 and the register 86 from any of the devices through the common bus. As shown in FIG. 6, the random access memory 85 and the register 86 from any of the devices through the common bus 5. As shown in FIG. 6, the random access memory 85 contains storage areas for addresses A to A+(m−1). These address A to A+(m−1) are provided corresponding to the respective devices 6*l* to 6*m*, that is, device numbers IT0 to IT(m−1) for each address. One bit storage area is provided corresponding to the respective processors 1*l* to 1*n*, and the data indicating whether an interrupt is or is not required is stored therein. More particularly, if an interrupt is needed, then a logical "1" is stored and if no interrupt is required, then a logical "0" is stored.

Accordingly, if and when a device number data is inputted as an address signal to the random access memory 85 from any of the devices, a corresponding processor number data is read out from a storage area in the random access memory 85 corresponding to the address signal and is stored in the register 87. The register 87 outputs a destination data corresponding to each processor to apply to the respective input terminals of the AND gates 88*l* to 88*n* and the multiplexer 81. To the multiplexer 81 is applied a bus busy signal from the bus controller 7 as shown in FIG. 3. The bus busy signal inhibits the multiplexer 81 from selecting the processor number data when the processors 1*l* to 1*n* output bus request signals to the bus controller 7. The multiplexer 81 sequentially withdraws a processor number data based on a select signal from the above described register 84 and applies a +1 signal to an adder circuit 82 if there is a logical "1" in any of the processor number data. The adder circuit 82 adds +1 to the address data from the register 84 and applies the result of the addition as an address signal to the read only memory 83.

The above described AND gates 88*l* to 88*n* apply interrupt signals ITR1 to ITRn to the corresponding processors, when the AND gates 88*l* to 88*n* receive the processor number data from the register 87 and an interrupt instruction from the register 84. The register 86 stores the device number data and outputs the same to the common bus 5.

Figure 7:
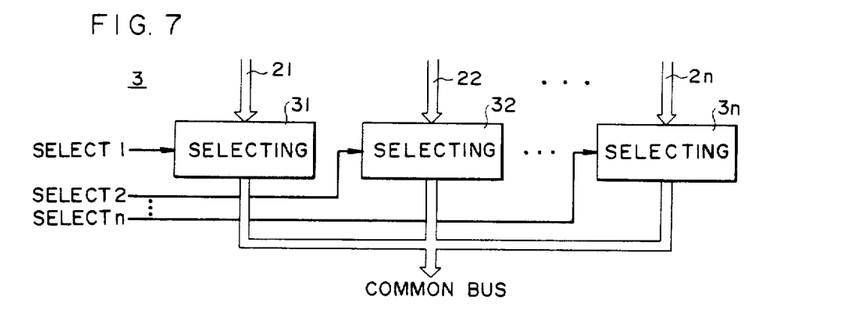
FIG. 7 is a detailed block diagram of a bus selecting circuit as shown in FIG. 2.

FIG. 7 is a detailed block diagram of the bus selecting circuit 3 as shown in FIG. 3. The bus selecting circuit 3 includes selectors 3*l* to 3*n* corresponding to the respective processors 1*l* to 1*n*. Local buses 2*l* to 2*n* are connected to the respective selectors 3*l* to 3*n*, and select signals 1 to n from the bus controller 7 are applied to the selectors 3*l* to 3*n*, respectively. The output from the selectors 3*l* to 3*n* are commonly connected to the common bus 5.

Figure 8:
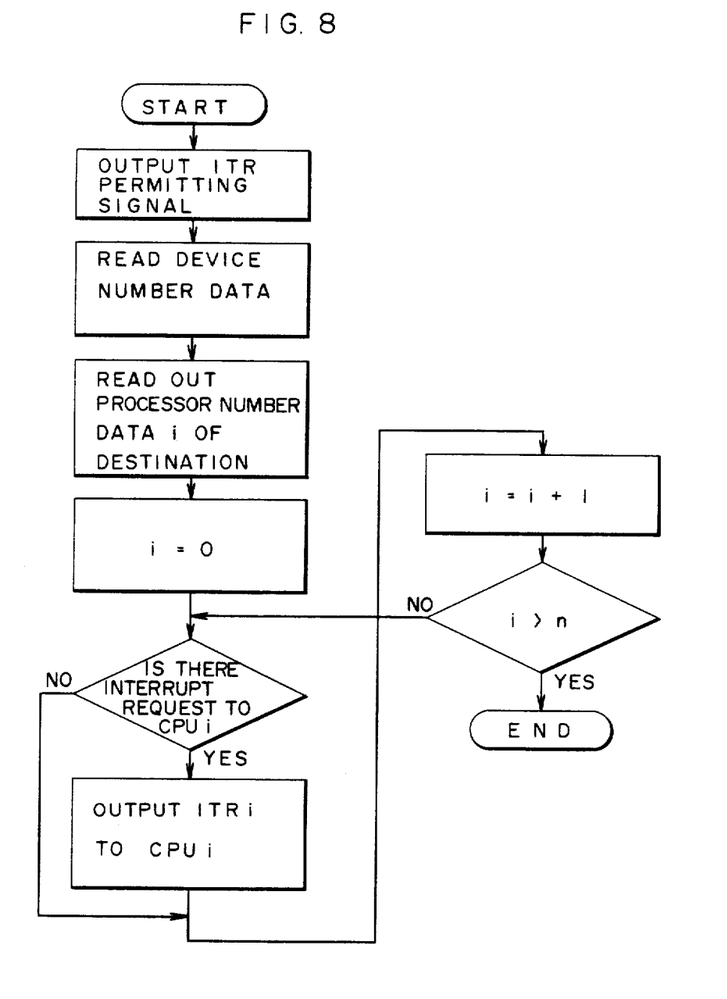
FIG. 8 is a flow diagram for explaining an operation of one embodiment of the present invention.

FIG. 8 is a flow diagram for explaining an operation of one embodiment of the present invention.

Referring to FIGS. 2 to 8, a detailed operation of an embodiment of the present invention will be described. In an initial state, the program of step 1 is read out from the read only memory 83 and is stored in the register 84.

An interrupt permitting signal is applied to each of the devices 6*l* to 6*m* from the register 84 through the common bus 5. According to the respective interrupt signals, the respective devices 6*l* to 6*m* recognize that interrupt should be permitted. Then a device 61, for example, outputs a device number data IT0 as an interrupt request signal to the common bus 5. The device number data IT0 is stored in the register 86 and also is applied as an address signal to the random access memory 85. Correspondingly, the random access memory 85 outputs from the address A a data indicating the processor 11 which can be interrupted by the device 61. This data is provided to the register 87 which stores the data. Accordingly, only the first bit in the register 87 becomes a logical "1". This signal is applied to one input terminal of the AND gate 88*l* and to the multiplexer 81.

At this time, the bus busy signal is of a high level, since the processor 11 does not output a bus request signal REQ1. For this reason, the multiplexer 81 withdraws a +1 signal from the register 87 in accordance with the data indicating that there is at least one processor to be interrupted, and applies the +1 signal to the adder circuit 82. The adder circuit 82 adds +1 to the address data from the register 84 and applies the result of the addition to the read only memory 83. Hence, the program of the step 2 stored in the next address is read out from the read only memory 83 and is stored in the register 84. An interrupt instruction signal from the register 84 is applied to the AND gates 88*l* to 88*n*. At that time, the AND gate 88*l* is opened so that an interrupt signal ITR1 is applied to the processor 11, since an interrupt instruction data is applied only to the AND gate 88*l*. The processor 11 receives the interrupt signal ITR1 and applies an interrupt request signal REQl to the bus controller 7.

As described in FIG. 3, the bus controller 7 applies a select signal 1 to the bus selecting circuit 3 according to the interrupt request signal REQl. The bus selecting circuit 3, as shown in FIG. 5, enables only the selector 31 responsive to the select signal 1. As a result, the local bus 21 of the processor 11 is connected to the common bus 5. If the local bus 21 is connected to the common bus 5, the processor 11 reads the device number data IT0 stored in the register 86. Accordingly, the processor 11 can immediately judge that an interrupt request from the device 61 has been requested. Therefore, the processor 11 communicates with the device 61 through the local bus 21 and the common bus 5.

Next, if and when an interrupt request signal from the device 62 is inputted, a series of operations described in the foregoing are repeated. After such operations are repeated by the number of the processors, the sequence is returned back to the step 1.

As described in the foregoing, in accordance with one embodiment of the present invention, the data specifying a processor which is requested to be interrupted corresponding to each device is stored in the random access memory 85 and a corresponding data is read out from the random access memory 85 upon an interrupt request from a device so that an interrupt processing to the corresponding processor is made. Accordingly, an interrupt processing by way of an arbitrary combination of any of a plurality of processors and any of a plurality of devices can be made possible. If the change of the processor to be interrupted is desired, then it is merely necessary to change the contents of the random access memory 85.

Although the present invention has bee described and illustrated in detail it is clearly understood that the same is by way of illustration and example only and is not to be taken by way of limitation, the spirit and scope of the present invention being limited only by the terms of the appended claims.

What is claimed is:

1. A multiprocessor system comprising:
a plurality of processor means for generating a bus request signal,
local buses individually connected to each of said processor means,
a plurality of device means for generating an interrupt request signal, respectively, said device means being commonly controlled by each of said processor means,
a common bus commonly connected to each of said device means,
data storing means for storing destination data for specifying at least one of said plurality of processor means which is requested to be interrupted by each of said device means,
interrupt controlling means responsive to the interrupt request signal from said device means for reading out the destination data from said data storing means for recognizing the processor means corresponding to the destination according to said destination data for providing an interrupt signal to the corresponding processor means, and
bus selecting means for connecting a local bus of the corresponding processor means to said common bus according to the bus request signal from the processor mean to which said interrupt signal is provided.

2. A multiprocessor system in accordance with claim 1, wherein
identifying numbers are previously assigned to the respective device means, the respective identifying numbers being different from each other,
said respective device means includes means for outputting as an interrupt request signal a signal based on said identifying number,
said data storing means includes storage areas corresponding to the respective identifying numbers of said device means, and which further comprises
means for applying destination data of said device means corresponding to said identifying number to the storage areas, respectively.

3. A multiprocessor system in accordance with claim 1, wherein
said interrupt controlling means includes interrupt permitting signal generating means for applying interrupt permitting signals to said device means, and
said respective device means includes interrupt request signal generating means responsive to said interrupt permitting signal from said interrupt permitting signal generating means for outputting an interrupt request signal.

4. A multiprocessor system in accordance with claim 3, wherein
said interrupt controlling means includes
interrupt instruction signal generating means for generating an interrupt instruction signal, and
means for applying an interrupt signal to the processor means corresponding to the destination data based on the destination data read out from said data storing means and the interrupt instruction signal from said interrupt instruction signal generating means.

5. A multiprocessor system in accordance with claim 4, which further comprises means for enabling an interrupt instruction signal to be generated from said interrupt instruction signal generating means responsive to recognition of presence and/or absence of the destination data from said data storing means.

6. A multiprocessor system in accordance with claim 1, wherein
   said bus selecting means includes
   bus selecting signal generating means for generating a bus selecting signal based on the bus request signals from said processor means, and
   means responsive to the bus selecting signals from said bus selecting signal generating means for connecting the local bus of the corresponding processor means to the common bus.

7. A multiprocess system comprising:
   a plurality of processor means each including means for generating a unique bus request signal,
   local buses individually connected to each of said processor means,
   a plurality of device means each including means for generating a unique interrupt request signal, respectively,
   a common bus connected to each of said device means,
   said device means being commonly controlled by each of said processor means via said common bus,
   destination determining means for storing destination data for specifying at least one of said plurality of processor means to be interrupted by each of said device means,
   interrupt controlling means connected to said common bus means and to each of said processor means,
   said interrupt controlling means responsive to the interrupt request signal from said device means for reading out destination data from said destination determining means for identifying the processor means corresponding to said destination data and for providing an interrupt signal to the corresponding processor means, and
   bus selecting means connected to said local buses and to said common bus for connecting a local bus of the identified processor means corresponding to said destination data to said common bus according to the bus request signal from the processor means to which said interrupt signal is provided.

* * * * *